United States Patent Office 3,784,631
Patented Jan. 8, 1974

3,784,631
DIMERIZATION OR CODIMERIZATION
OF α-OLEFINS
Henry R. Menapace, Stow, and Gerald S. Benner and
Neil A. Maly, Tallmadge, Ohio, assignors to The
Goodyear Tire & Rubber Company, Akron, Ohio
No Drawing. Filed Mar. 9, 1972, Ser. No. 233,364
Int. Cl. C07c 3/10
U.S. Cl. 260—683.15 D        7 Claims

ABSTRACT OF THE DISCLOSURE

There is disclosed a process for the dimerization or co-dimerization of α-olefins by means of a catalyst system comprising (A) an organometallic compound, (B) a nitrogen-containing ligand and (C) the reaction product of a tungsten halide and a diketone.

---

This invention is directed to a process for the dimerization or codimerization of α-olefins by means of a catalyst system comprising (A) an organometallic compound, (B) a nitrogen-containing ligand and (C) the reaction product of a tungsten halide and a diketone.

By the term olefin dimerization is meant that two moles of an olefin are dimerized, for instance, two moles of propylene are dimerized to produce one mole of hexene. By the term codimerization is meant that two dissimilar olefins are dimerized to form a new olefin, for instance, one mole of propylene is codimerized with one mole of 1-butene to form one mole of α-heptene.

The α-olefins which are dimerized or codimerized in accordance with this invention are olefins containing from 2 through 8 carbon atoms and may be straight or branched chain olefins. Representative of such olefins are ethylene, propylene, 1-butene, isobutene, 1-heptene, 2-methyl-1-butene, 2-ethyl-1-butene, 1-hexene, 2-hexene, 3-hexene, 2-methyl-1-pentene, 2-methyl-1-hexene, 1-pentene, 2-methyl-1-heptene, 1-octene and other branched or straight chain α-olefins containing from 2 through 8 carbon atoms.

According to the invention, olefins containing from 2 through 8 carbon atoms are dimerized or codimerized by means of a catalyst comprising, (A) at least one organometallic compound selected from the group consisting of:

$$R_nMX_{3-n}$$

and $$R_3M_2X_3$$

wherein R is an alkyl radical containing from 1 through 10 carbon atoms, X is a halogen from the group of chlorine, bromine and iodine, n is at least 1 but not more than 2 and M is from the group of aluminum, indium, boron and gallium;

(B) at least one ligand of the formula:

$$NR_1R_2R_3$$

wherein $R_1$ is selected from the group of hydrogen, alkyl, cycloalkyl, alkenyl and aralkyl; $R_2$ is selected from the group of alkyl, cycloalkyl, alkenyl, aryl, aralkyl and alkaryl; and $R_3$ is selected from the group of hydrogen, alkyl, cycloalkyl, alkenyl and aralkyl; and wherein $R_1$, $R_2$ and $R_3$ contain from 1 through 20 carbon atoms; and if $R_2$ is aryl or alkaryl then at least one of $R_1$ and $R_3$ must be hydrogen, and;

(C) the reaction product of (1) at least one tungsten salt selected from the group consisting of tungsten hexachloride, tungsten hexabromide, tungsten pentachloride, tungsten pentabromide, tungsten oxytetrachloride, tungsten oxytetrabromide and tungsten oxytetraiodide and (2) at least one diketone having the formula:

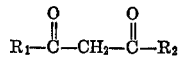

wherein $R_1$ and $R_2$ are selected from the group consisting of aromatic, alicyclic, aliphatic, aryloxy and alkoxy radicals, which contain from 1 through 10 carbon atoms, and hydrogen.

In the practice of this invention, it is generally desirable to conduct the dimerization or codimerization as a continuous process. However, batch processes may be successfully employed. The temperature at which the dimerization or codimerization reaction of this invention is conducted depends somewhat on the reactants employed and the rate of reaction desired. Generally temperatures ranging from about 0° C. to about 150° C. are employed with about 20° C. to about 80° C. being more preferred.

If a continuous process is employed, the rate at which the process is conducted, again, will depend on the temperature employed and the conversion desired. The rate is usually indicated as liquid residence times. In this invention residence times will vary from about 1 minute to 3 hours with 5 minutes to 1 hour being more preferred.

The pressure of the dimerization or codimerization process has not been found to be too critical and may vary boardly from about 0 to about 1000 pounds per square inch gauge (p.s.i.g.) with about 50 to about 500 p.s.i.g. being more preferred.

In the practice of this invention, it is usually desirable to employ pure olefins as the only reactants. However, it may be desirable to employ a diluent for such reasons as a heat transfer medium and the like. If a diluent is employed it should obviously not react with either the reactant or the resulting products. Representative of such inert diluents may be the paraffin hydrocarbons such as hexane, pentane, propane, as well as other gases or liquids which are known to be inert. Also suitable are chlorobenzene, benzene and the like.

The first catalyst component is a reducing agent responding to the formulae:

$$R_nMX_{3-n}$$

or $$R_3M_2X_3$$

wherein n is a whole number of at least one and not more than two; R is an alkyl radical containing from 1 to 10 carbon atoms; and X is a halogen such as chlorine, bromine or iodine; and M is a metal from the group of boron, aluminum, gallium and indium. Representative of such organometallic compounds are ethylaluminum dichloride, diisobutylaluminum bromide, propylaluminum diiodide, hexylaluminum bromide, diethylaluminum chloride, decylaluminum diiodide, diheptylaluminum chloride, ethylaluminum sesquichloride, ethylaluminum sesquibromide, and the like. Also representative of the compounds useful in this invention are ethyl boron dichloride, diisobutyl boron bromide, hexyl boron iodide, diethyl boron fluoride, diheptyl boron chloride, and the like. Also useful in this invention are the gallium and indium compounds as set forth above, where gallium and indium are substituted for aluminum and boron. It is preferred to employ ethylaluminum dichloride, ethylaluminum sesquichloride or diethylaluminum chloride.

The second catalyst components are certain nitrogen-containing ligands responding to the formula:

$$NR_1R_2R_3$$

wherein $R_1$ is selected from the group of hydrogen, alkyl, cycloalkyl, alkenyl and aralkyl; $R_2$ is selected from the group of alkyl, cycloalkyl, alkenyl, aralkyl, aryl and alkaryl; $R_3$ is selected from the group of hydrogen, alkyl, cycloalkyl, alkenyl and aralkyl; and if $R_2$ is aryl or alkaryl, then at least one of $R_1$ and $R_3$ must be hydrogen.

Representative of ligands responding to this formula are dimethylpentenylamine, methylpentenylamine, cyclopentylmethylamine, 2 - chlorocyclopentylamine, benzylamine, 4-chlorobenzylamine, phenylbutenylamine, phenylbutylamine, 4 - chlorophenylmethylamine, phenylcyclopentylamine, 2-chloroaniline, 4-chloroaniline, 4-methoxyaniline, 4 - methylaniline, cyclohexylamine, 2 - methylcyclohexylamine, 4 - chloro - 2 - methylaniline, dicyclohexylamine, 4 - chlorocyclohexylamine, phenylcyclohexylamine, 4 - carbomethoxyaniline, 4 - nitroaniline, 4 - diethylaminoaniline, tributylamine, triisobutylamine, methylamine, t-butylamine, cyclopentylamine, aniline, 2-methylaniline, 3 - butylaniline, 2 - nitroaniline, 2,4 - dimethylaniline, 3,5 - dimethylaniline, 2,6 - dimethylaniline, dibutylamine, and 2,6 - dimethyl - 4 - bromoaniline. Also amines wherein the nitrogen atom constitutes a part of a heterocyclic saturated ring may be used; such a compound is represented by 4-methyl piperidine and other substituted piperidines; also tetrahydropyrroles and substituted tetrahydropyrroles, also piperazines and substituted piperazines. It is preferred to use aniline, 2-methyl or 4-methyl aniline, 2-nitro or 4-nitro aniline, 3-butylaniline, cyclohexylamine, dibutylamine, 2,4-dimethylaniline or 2,6-dimethylaniline.

The third catalyst component of this invention is the reaction product of a tungsten salt and a diketone. Representative of the tungsten salts employed are tungsten hexachloride, tungsten hexabromide, tungsten pentachloride, tungsten pentabromide, tungsten oxytetrabromide, tungsten oxytetrachloride and tungsten oxytetraiodide.

The diketone compounds employed to react with the halide of this invention may be defined by the formula:

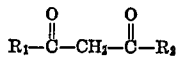

wherein $R_1$ and $R_2$ are selected from the group of aromatic, alicyclic, aliphatic, aryloxy and alkoxy radicals, which contain from 1 through 10 carbon atoms, and hydrogen.

Representative of such ketones are 2,4-pentanedione, dibenzoyl methane, dipivaloyl methane, 1,3 - diphenyl-1,3 - propanedione, 2,2,6,6 - tetramethyl - 3,5 - heptanedione, 1 - phenyl - 1,3 - butanedione, 1,3 - dicyclohexyl-1,3-propanedione, ethyl acetoacetate (buta-3-on-1-ate), phenyl acetoacetate, ethyl benzoylacetate, with 2,4-pentanedione and dibenzoyl methane being preferred.

To prepare the reaction product of the tungsten halides and the diketones employed is straight forward and requires no special technique. The usual practice is to react one mole of the desired tungsten halide with either one or two moles of the desired diketone compound while they both are dissolved in an inert solvent such as chlorobenzene, pentane and the like. The tungsten halide is usually dissolved in the solvent at about 0.1 molarity and the proper amount of the acidic compound added. Then the reaction product is usually analyzed to determine the exact amount of tungsten in the mixture to determine how much to use.

The amount of catalyst used in the process is not critical so long as a catalytic amount is employed. As little an amount of catalyst as 0.01 part by weight of the tungsten (with other components in the proper ratios) has shown fair catalytic activity. The amount employed will, of course, depend on the rate of dimerization desired,
and the pressure and temperature employed. Those skilled in the art will be able to determine the proper catalytic amount to employ without any difficulty.

The molar ralationship between the catalyst components employed in this invention may vary quite widely. For instance, the molar relationship of the organometallic compound (M) to the molar rationship of the nitrogen-containing ligand (N) to the reaction product of the tungsten halide and the diketones (W) may vary in the relationship M/N/W of from 4 to 40/1 to 3/1. A more preferred ratio of the catalyst components would be M/N/W of from 10–20/1.5–2.5/1.

There is no particular technique required to prepare the catalyst of this invention. The catalyst may be prepared in situ or they may be pre-formed. By the term in situ is meant that each individual catalyst component is added to the reaction mixture. By the term pre-formed is meant that the catalyst components are pre-mixed and then added to the polymerization mixture. It is usually the practice to add the catalyst components while they are dissolved in one of the inert solvents mentioned herein. This is not an absolute requirement, but for better control of accuracy, this technique has been employed.

The practice of this invention may be further illustrated by reference to the following examples which are intended to be representative rather than restrictive of the scope of the invention.

In these examples 0.02 mole of propylene were reacted using as a catalyst 0.002 mole of ethylaluminum sesquichloride, 0.0004 mole of aniline and 0.0002 mole of the reaction product of one mole of tungsten hexachloride and the various diketone compounds listed in the table below in the molar relationship listed in the table. The tungsten hexachloride prior to being mixed with the diketone compounds had a molarity of 0.1, the ethylaluminum sesquichloride was diluted to a molarity of 2 and the aniline to a molarity of 0.2, all in chlorobenzene.

TABLE I

| Ex. | Diketones | Percent—of | | | | |
| | | Conv. | Sel. | 4-methyl-pentenes | 2,3-dimethyl-1-butene | 2-methyl-1-pentene |
| --- | --- | --- | --- | --- | --- | --- |
| 1 | 1 mole 2,4-pentanedione | 74 | 85 | 6.1 | 48 | 31 |
| 2 | 1 mole dibenzoylmethane | 69 | 92 | 6.3 | 54 | 31 |
| 3 | 1 mole dipivaloylmethane | 73 | 76 | 5.3 | 43 | 28 |

While certain representative embodiments and details have been shown for the purpose of illustrating the invention, it will be apparent to those skilled in this art that various changes and modifications may be made therein without departing from the spirit or scope of the invention.

What is claimed is:

1. A process in which α-olefins containing from 2 through 8 carbon atoms are dimerized or codimerized by means of a catalyst comprising, (A) at least one organometallic compound selected from the group consisting of:

$$R_nMX_{3-n}$$

and $$R_3M_2X_3$$

wherein R is an alkyl radical containing from 1 through 10 carbon atoms, X is a halogen from the group of chlorine, bromine, and iodine, $n$ is at least 1 but not more than 2, and M is from the group of aluminum, indium, boron and gallium;

(B) at least one ligand of the formula:

$$NR_1R_2R_3$$

wherein $R_1$ is selected from the group of hydrogen, alkyl, cycloalkyl, alkenyl and aralkyl; $R_2$ is selected from the group of alkyl, cycloalkyl, alkenyl, aryl, aralkyl and alkaryl; and $R_3$ is selected from the group of hydrogen, alkyl, cycloalkyl, alkenyl and aralkyl; and wherein $R_1$, $R_2$ and $R_3$ contain from 1 through 20 carbon atoms; and if $R_2$ is aryl or alkaryl, then at least one of $R_1$ and $R_3$ must be hydrogen, and;

(C) the reaction product of (1) at least one tungsten salt selected from the group consisting of tungsten hexachloride, tungsten hexabromide, tungsten pentachloride, tungsten pentabromide, tungsten oxytetrachloride, tungsten oxytetrabromide and tungsten oxytetraiodide and (2) at least one diketone having the formula:

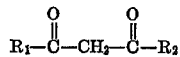

wherein $R_1$ and $R_2$ are selected from the group consisting of aromatic, alicyclic, aliphatic, aryloxy and alkoxy radicals, which contain from 1 through 20 carbon atoms, and hydrogen, in which 1 mole of the tungsten salt is reacted with 1 or 2 moles of the diketone and in which the molar relationship between catalyst components (A)/(C) ranges from about 10/1 to about 20/1 and the molar relationship between catalyst components (B)/(C) ranges from about 1.5/1 to about 2.5/1.

2. The process according to claim 1 in which the α-olefin is propylene.

3. The process according to claim 1 in which the organometallic compound is selected from the group of ethylaluminum dichloride, diethylaluminum chloride and ethylaluminum sesquichloride.

4. The process according to claim 1 in which the ligand of the formula:

$$NR_1R_2R_3$$

is selected from the group of aniline, 2-methylaniline, 4-methylaniline, 3-butylaniline, 2-nitroaniline, 4-nitroaniline, cyclohexylamine, dibutylamine, 2,4-dimethylaniline and 2,6-dimethylaniline.

5. The process according to claim 1 in which the diketone compound is selected from the group of 2,4-pentanedione and dibenzoyl methane.

6. The process according to claim 1 in which the α-olefin is propylene, the organometallic compound is ethylaluminum sesquichloride, the ligand of the formula:

$$NR_1R_2R_3$$

is aniline and the diketone compound is 2,4-pentanedione.

7. The process according to claim 1 in which the α-olefin is propylene, the organometallic compound is ethylaluminum sesquichloride, the ligand of the formula:

$$NR_1R_2R_3$$

is aniline and the diketone compound is dibenzoyl methane.

References Cited
UNITED STATES PATENTS

| | | | |
|---|---|---|---|
| 3,318,860 | 5/1967 | Eichenbaum | 252—429 |
| 3,544,649 | 12/1970 | Dixon et al. | 260—683 |
| 3,558,518 | 1/1971 | Zuech | 252—429 |

PAUL M. COUGHLAN, JR., Primary Examiner

U.S. Cl. X.R.

252—429 B, 431 N